March 16, 1937. E. R. WIGAN 2,073,913
MEANS FOR GAUGING MINUTE DISPLACEMENTS
Filed Sept. 4, 1935   2 Sheets-Sheet 2
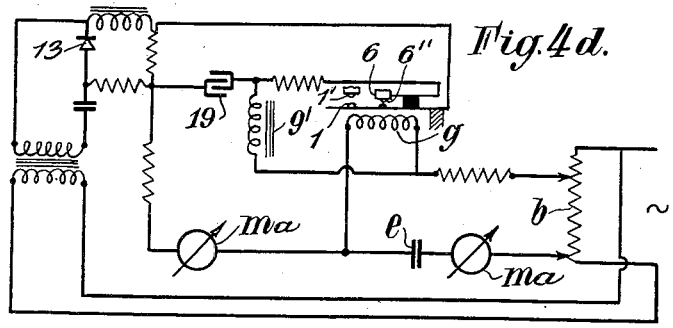
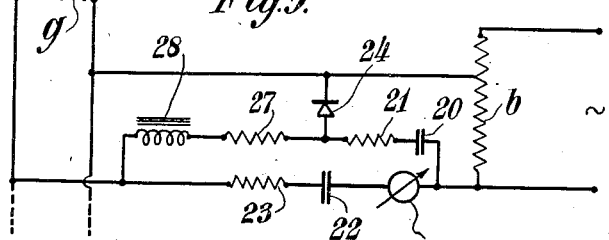
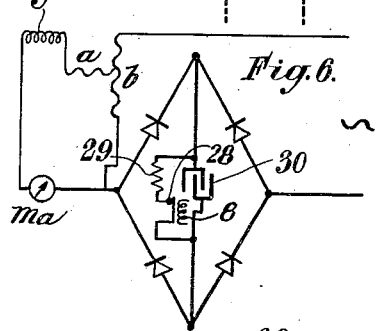
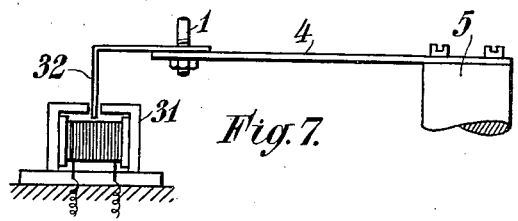
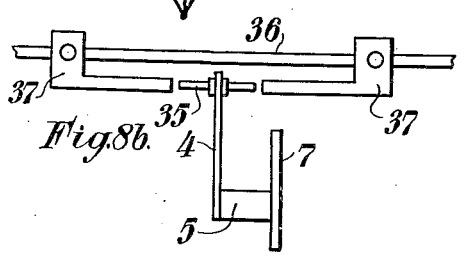
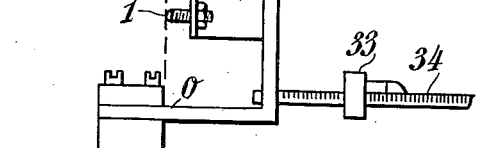
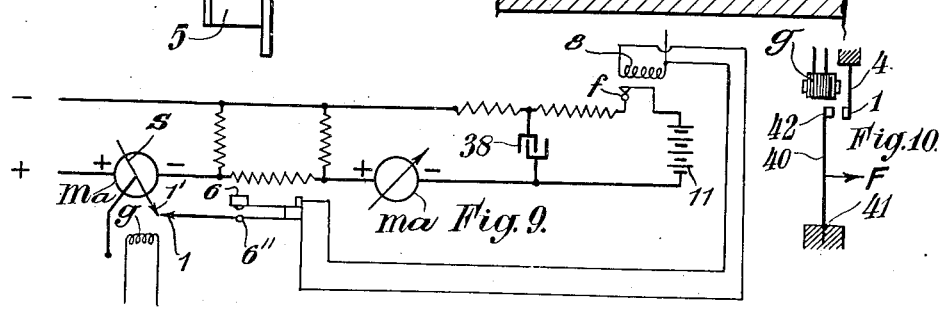
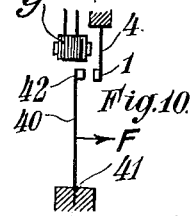
Inventor:
E. Ramsay Wigan Patented Mar. 16, 1937

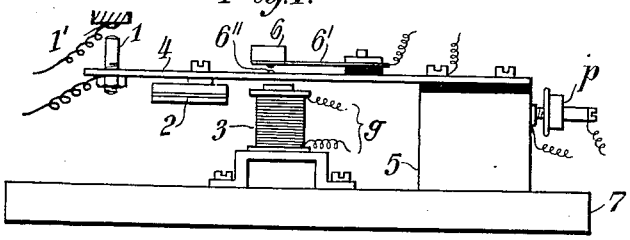
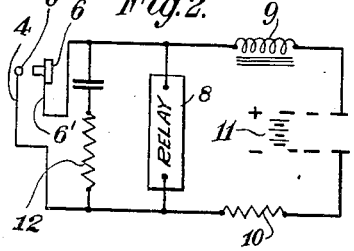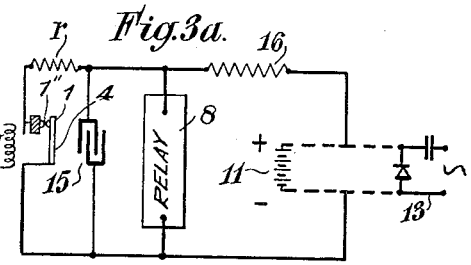
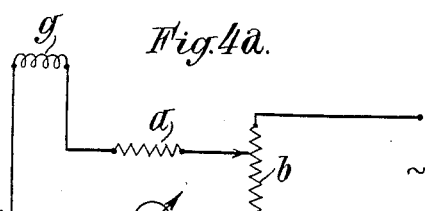
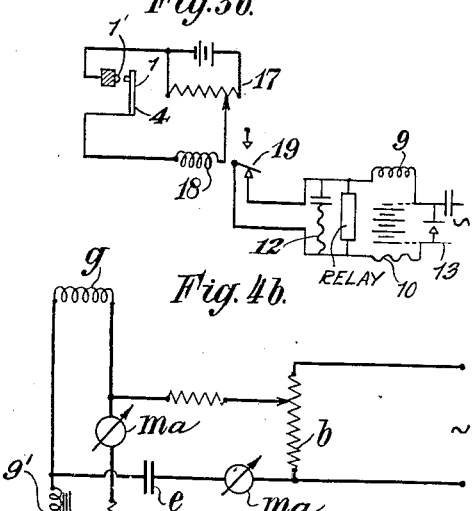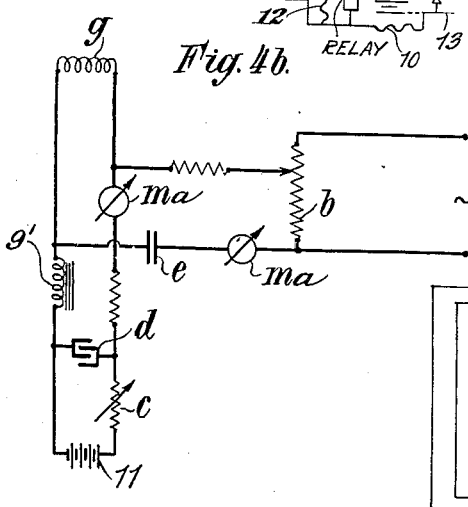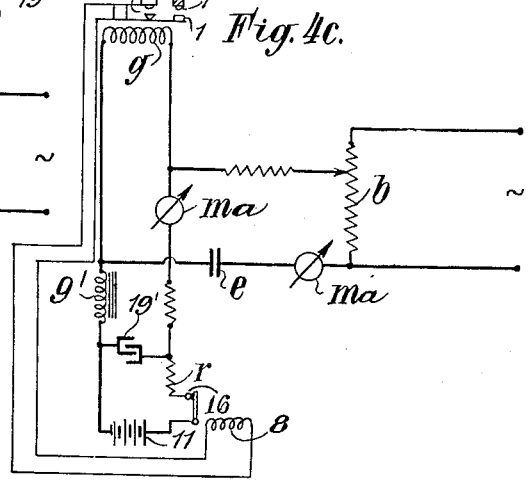

2,073,913

UNITED STATES PATENT OFFICE 2,073,913

MEANS FOR GAUGING MINUTE DISPLACEMENTS

Edmund Ramsay Wigan, Lee, London, England

Application September 4, 1935, Serial No. 39,116
In Great Britain June 26, 1934

19 Claims. (Cl. 177—351)

*Fundamental phenomenon.*—If we consider a flexible resilient blade (hereafter referred to as a "vibrator") maintained in vibration by any suitable means, for example by an electromagnetic driving arrangement through which passes an alternating current (hereafter referred to as the "driving means") and if we suppose that a surface on a solid body, perpendicular to the mean position of this vibrator, is caused to approach the said vibrator, it is known that, when the free end of the vibrator touches the face of the body the vibration is damped, and that, when the body is slightly withdrawn from the position it occupied when the vibration became damped, the vibration will resume its former undamped state.

Now, the present invention is concerned with a hitherto unknown physical phenomenon, recently discovered by myself, entirely different from the above, which takes place when a surface on a solid body, parallel to the mean position of a vibrator so proportioned and mounted that the frequency of one of its modes of natural or resonant vibration is near to (above or below) the (suitably chosen) frequency of the forces maintaining it in vibration, is caused to approach this vibrator: when the face of the body is so near the vibrator as to be touched by the said vibrator with a certain very small force of impact in its extreme excursion towards the said face (a position referred to hereafter as "vibratory contact") instead of the vibration being damped, the vibrator breaks into a new, and particularly distinctive mode of intermittent contact with the face of the body, which new mode of vibration (hereafter referred to as the "vigorous vibration") is characterized, and distinguished from the damping referred to above, in that it is more vigorous than the normal steady mode of vibration impressed upon the vibrator by the driving means and is generally of greater amplitude, and in that, when the solid body is slightly withdrawn from the position it occupied when the initial impact occurred which caused this new, vigorous mode of vibration to set in, the vibrator does not return to its normal steady or controlled mode of vibration, but, on the contrary, the said vigorous mode of vibration persists until the said solid body is further withdrawn, when the normal steady mode of vibration sets in again.

*General application.*—I have found that this new, vigorous mode of vibration, which characterizes the occurrence of "vibratory contact" between the vibrator and the face of the solid body, sets in when the minimum distance between the two is of the order of one ten millionth of an inch, that is to say, that "vibratory contact" indicates a proximity of the body and of the vibrator of this order of dimension, so that, by ascertaining the moment when the new vigorous mode of vibration sets in, the position of the solid body can be determined with that order of accuracy.

It will be appreciated therefore that this invention provides means for indicating in a simple, sensitive and accurate manner that a very slight force of contact has developed between two surfaces, e. g. gauging surfaces.

It has been found that the substitution of the distinctive mode of vigorous vibration of the vibrator for the steady or controlled state of vibration constitutes a far more precise indication of the close proximity of the vibrator and body than any method of mechanical or electrical contact hitherto provided can give, so that, by this method, displacements of the order of one ten millionth of an inch can be easily detected, observed, measured, indicated, recorded or made use of, as will be more fully shown hereafter, such detection, observation, measurement, indication, recording or utilization being hereafter referred to as a "gauging operation" for the sake of briefness.

According to my invention, I provide apparatus adapted to utilize the phenomenon described above for detecting, observing, indicating, measuring, recording or otherwise making use of, minute displacements down to the order of dimension mentioned.

In order to carry out my invention, all such apparatus comprise as a fundamental element a linear distance gauge, consisting of a fixed supporting bed with a gauge carriage moveable with respect to the said supporting bed, and a contact indicating device, capable of fine adjustments, comprising a "feeder gauge surface" carried upon a vibrator mounted on a support fixed to the carriage, together with associated means for maintaining and controlling the vibration of the said vibrator, so that the latter is maintained in such a state of vibration as to become the seat of the new vigorous mode of vibration, when the "feeler gauge surface" comes into vibratory contact with a "contact gauge surface" carried by the body the displacement of which is to be detected, observed, indicated, measured, recorded or utilized.

(Instead of one contact gauge surface on the vibrator and on the body, there may be several such contact surfaces.)

The contact gauge surface instead of being carried by the solid body the displacement of which is to be detected, observed, measured, indicated, recorded or utilized, may be on a separate member adapted to be displaced directly or indirectly, by the said body.

The position of the contact and feeler gauge surfaces may be interchanged, the resilient vibrating member carrying the feeler gauge surface being mounted on the solid body the displacement of which causes the phenomenon referred to, and the contact gauge surface being carried by a suitable fixed member.

In the various cases referred to herein it will be assumed for the sake of illustration that the feeler gauge surface is carried by the flexible resilient member which is caused to vibrate, but it will be understood that the invention may also be applied in cases where the body under observation is vibrating and the feeler gauge surface, capable of fine adjustment, either is not vibrated, or is also caused to vibrate, the various parts being so designed and the driving frequencies being so chosen that the vigorous state of vibration is set up at the moment that vibratory contact is established between the two gauging surfaces. The position movement of the vibrator may also be kept constant, the contact gauge surface being then capable of fine adjustment, either together with the body, or with respect thereto.

The frequency at which the vibrator is driven must be near to and either above or below, but preferably above its fundamental frequency (or one of its other modes) of vibration. For example the driving frequency may be below and near that of the higher modes, but above the fundamental mode of vibration. Only under exceptional circumstances does the driving frequency have to be very precisely chosen. For various subsidiary reasons, it should, however, be as constant as possible.

*Typical form of apparatus.*—The primary constitutive element in all the forms of apparatus, according to my invention, is therefore analogous to a linear distance gauge, one of the gauge surfaces of which is mounted on a vibrator, as has just been described, a gauging operation consisting in bringing one of the gauge surfaces corresponding, as a unit, with the usual "feeler" element of a distance gauge, in vibratory contact with the other gauge surface, by means of a combination of coarse and fine adjustments. Vibratory contact between the feeler gauge surface and the contact gauge surface on the body being gauged is indicated by the vigorous vibration described above.

This fine adjustment comprises means for gradually causing one of the members of the gauge to approach the other, and for measuring the displacement so produced, so as to ascertain exactly the position of the other member of the gauge.

*Methods of fine adjustment.*—The fine adjustment of the "feeler gauge surface" of the linear gauge surface is preferably obtained by using a relatively stiff member or system of members for the vibrator and deflecting this by the application of forces, preferably derived from an electromagnetic arrangement. This may conveniently be obtained either by altering the amplitude of the vibration by varying the alternating current flowing in the electromagnetic system, or by displacing the mean position of the vibrator by superposing an adjustable direct current on this alternating current. The apparatus can be calibrated so that either (or both) these currents, the magnitude of which can be read from a suitable indicator, becomes (or become) a measure of the linear distance through which the feeler gauging surface or surfaces have been caused to move relative to the supporting carriage, that is, becomes (or become) a measure of the fine adjustment.

It is found that, by superposing in the same magnetic system the fluxes due to both the deflecting current (D. C.) and the main oscillatory driving current (A. C.) the flux due to the former current produces no serious hysteresis effects: moreover the deflection of the mean position of the vibrating feeler element becomes practically a linear function of the D. C. A current measuring instrument can therefore be arranged to indicate the deflection by indicating this current.

The rapid increase in the force of contact produced by the vigorous vibration serves to define the body's position at the moment that contact is established. For example, it may cause an audible chattering sound which is readily observed; alternatively the change in the mode of vibration can be arranged to operate visual indicating, or recording means, or to bring about any desired mechanical or other operation.

*Control of fine adjustment.*—The simplest form of control is of course a hand-control; by slowly increasing the alternating or direct electric current flowing in the electromagnetic system of the vibrating element, the feeler gauge surface is brought near to the contact gauge surface on the body the displacement of which is to be ascertained (either at the extreme end of the excursion of the vibrator towards the said contact gauge surface, or with respect to the mean position of the vibrator) until the sudden setting-in of the vigorous mode of vibration, indicated by a violent rattling of the gauge device, indicates that "vibratory contact" has been established. The value of the current read on the current measuring instrument is a measure of the distance the feeler gauge surface has moved prior to contact. The reading can be checked by reducing the current to the point at which the vigorous vibration is extinguished and then bringing again, in the same manner, the feeler gauge surface near to the contact gauge surface.

*Automatic control.*—My invention also includes methods and means for controlling automatically the small movements of the feeler gauge surfaces by an automatic process (hereafter referred to as "auto-control"). These methods and means become important when the invention has any but the very simplest form, namely, a simple distance gauge. The most fruitful field of application of the invention appears to be concerned with such auto-controlling means. All but the primary applications are concerned with these auto-controlling devices.

In certain arrangements a relay is arranged to be energized (by one of several possible schemes) when vigorous vibration is set up. The operation of the relay tends to extinguish the vibration by any suitable means, such as those described hereafter, for example by reducing the A. C. fed to the vibrator. When the vigorous vibration disappears the relay is automatically de-energized and the feeler gauge surface again approaches the contact gauge surface. In order to prevent "hunting" of such an arrangement, the return of the feeler gauge surface is made in such a way as to avoid abrupt movements as much as possible, for example, the current controlling the gauge movement is derived from a condenser-resistance network which only permits slow displacements of the mean position of the vibrator. In another arrangement the use of a relay is avoided by substituting for it a network containing a resistance combined with a condenser, the potential across which is the source of the controlling current and is directly controlled in magnitude by the amplitude of vibration of the vibrator.

*Types of auto-control.*—The amount of control exerted by the auto-controlling relay depends upon the function of the gauge device. If it is to keep a continuous record of a changing length the vigorous vibration is completely extinguished (as, for instance, by reducing the deflecting force to zero) immediately it is initiated.

If, however, the gauge is designed to give warning of very small changes in the length of, for example, a thermostat element, the vigorous vibration is not immediately extinguished when contact has been established, but, instead, it is brought to the point of incipient extinction by the withdrawal of the contact or feeler gauge surface through a small distance. With things adjusted in this manner, a very small further withdrawal of the gauge surface carried by the body under observation (i. e. as would be caused by a fall in temperature of a thermostat element) results in the complete extinction of the vigorous vibration, the re-opening of the relay, and the return of the gauge device to the position it occupied at the beginning of the cycle of events.

In this form the gauge device gives a warning (by the operation of the relay) directly the gauge surface carried by the gauged body reaches a certain point, namely, that at which vibratory contact is established, or goes beyond it. The warning is continued until this surface has been withdrawn sufficiently to extinguish the vigorous vibration. That is to say it is a maximum (or minimum) indicator or controlling device.

It should be noticed that the gauge device is capable of acting as a maximum (or minimum) indicator without the addition of subsidiary control by a relay. Without this control, however, there is a large difference between the position (or length) of the gauged object at the moment the vigorous vibration is initiated by vibratory contact with the gauge contact surface, and the position (or length) to which it has to return before this vigorous vibration extinguishes itself. This discrepancy between the lengths required to start and to stop the vigorous vibration is a serious fault. The operation of the relay-controlled circuit is designed to reduce this discrepancy.

For example, in a gauge device which develops a considerable amplitude of vigorous vibration, the length-discrepancy referred to may be 50 to $100 \times 10^{-6}$ ins. This can be reduced to about $1 \times 10^{-6}$ ins. by an auto-control arrangement. The great value of this arrangement is that the gauge device can be designed to develop pronounced vigorous vibration (which is an advantage in operating relay controls etc.) while still remaining sensitive to very small reductions in the gauge distance.

*Compensation for variation of supply voltage.*—In all that has been said so far a tacit assumption has been made, namely, that the forces driving the vibrating member of the gauge device are either constant or variable, but that they are all known.

In many forms of the gauge device it is desirable to reduce to a minimum the influence of these forces upon the gauging operation and to produce all the required fine adjustment or "gauging" movements of the vibrator by means of a source of direct current. (The primary reason for this is that the discrepancy referred to above, due to the vigorous vibration, becomes greater as the alternating forces increase; for many purposes this increase appears to be unmanageable.) It will be appreciated that the distance between the feeler gauge surface and the contact gauge surface the displacement of which is being observed, is a function of the alternating driving forces as well as the unidirectional deflecting forces. As the value of the D. C. is the more readily controlled and indicated, it is the A. C. which is preferably kept constant while the D. C. measuring instrument is calibrated to read "distance".

When the apparatus is supplied from the public supply, a variation of at least $\pm 5\%$ is to be expected in alternating voltage. (Say $5 \times 10^{-6}$ ins. uncertainty in the gauged length unless an A. C. meter is provided so that the driving current can be set to the proper value.) This uncertainty is serious if ignored, and if provided for by separate control, the operation of the gauge ceases to be entirely automatic.

Two ways of avoiding this fault have been devised and will be now described.

*Methods of compensation.*—In the first method of compensation, the vibrator is driven by an unpolarized magnet system. This has the effect of:

(1) Causing the vibrator to vibrate with a frequency which is twice that of the driving forces;

(2) Shifting the mean position of the vibrator towards the magnet system.

As the amplitude of (1) is of the same order as the value of (2), the net effect is that changes in the driving current have little or no effect upon the position in space of the extreme point reached by the gauge surface carried by the vibrator when the latter is receding from the driving magnet. Other advantages of an unpolarized winding are simplicity and the removal of one source of possible error, namely, the ageing of the magnet causing a diminution of the total flux.

In the second method of compensation the driving magnetic circuit is polarized by a magnet and is supplied with both alternating and direct current, both derived from the same source, the latter by rectification. The direction of the D. C. is arranged so as to shift the mean position of the vibrator away from the surface gauged, as the alternating voltage rises. Owing to the non-linear characteristic of the rectifier this arrangement is not perfect but can be adjusted to reduce very considerably the influence of variations of the main's voltage upon the true reading of the gauge device. The advantage of this arrangement is that the driving system may be mounted on whichever side of the vibrator is most convenient mechanically. Moreover, owing to the permanent magnet, this scheme permits further control of the vibrator by superposition of a second, controlled, and indicated, direct current which can be used to effect the gauging operation, as described herebefore.

Further advantages of using a polarized winding are that both attractive and repulsive forces, as may be desired, may be exerted on the vibrator by suitably directed currents, and that the response of the vibrator to such currents and to alternating currents tends to be closely linear.

*Circuits controlling the relay.*—It has now been shown that the gauge device can be made insensitive to supply variations, and that it can be arranged to be auto-recording, or auto-controlling of subsidiary apparatus. All this depends upon the vigorous vibration being able to operate a relay and so to bring the controlling effects into action. There are two principal ways of operating the relay:

(1) By a circuit completed through the feeler and the contact gauge surfaces;

(2) By the vigorous vibration causing a subsidiary jar-sensitive or "chatter" contact to break circuit.

Clearly the method (1) cannot be used for measurements of the very highest precision because the passage of the current causes local heating which leads to unknown and probably irregular local expansions of the gauge surfaces (of the order $10^{-5}$ ins.). It is, however, the more direct method of control. For example, a relay can be deenergized by the discharge, by way of the two gauge surfaces, of a very large condenser connected across the relay: being large, the condenser cannot immediately recharge and so the relay remains open so long as vibratory contact is maintained. In an alternative arrangement a quick acting relay can be operated through the gauge surfaces so as to operate with the frequency of the vigorous vibration. This relay can cause another to operate steadily (by the method (2) below) so long as the vibration lasts, this second relay being the main control-relay.

Method (2) is the best for the more precise gauges: it has the disadvantage, however, that it is suitable only for the more massive vibrating systems, and these again are suitable only for observing the movement of relatively massive surfaces. The "chatter" contact may be mounted on the vibrating element of the gauge device, chattering being induced directly the vigorous vibrations begin; or the "chatter" contact can be mounted on the contact gauge surface, if of suitable form and if sufficiently resilient to transfer the jarring of the unstable vibration to the "chatter" contact. The "chatter" contact is connected in parallel with the relay (which it normally short-circuits), the relay being fed with D. C. through a choke coil and a resistance (from a rectifier if convenient). The chattering of the contact forces the current normally passing through this contact to pass through the relay, and this effect is magnified by the choke coil. In this way, the relay is forced to operate quickly even if it is of a type which has a relatively high inductance, and it remains operated so long as the contact chatters. The operation is assisted by a small spark-quenching circuit connected across the chattering contacts.

*Applications of the apparatus.*—The field of application of the apparatus according to the present invention is obvious in certain directions: for example, it may be used:

(1) As the control element of a thermostat regulator; this is obvious in view of what has been stated above; the thermostat expansion element carries the contact gauge surface and another member, adjustable in position, carries the feeler gauge surface; expansion of the thermostat element causes vibratory contact and setting-in of the vigorous vibration, and this actuates a relay which controls the heating and at the same time brings the vigorous vibration to the point of incipient extinction. Contraction of the thermostat element then results in the complete extinction of the vigorous vibration, the re-opening of the relay, the return of the feeler gauge surface to its initial position and the resumption of the heating. The relay can be made also to operate a recorder.

(2) As the "feeler" element of a pure "limit" gauge; this has already been described in detail. It can be combined with a recording device of a suitable type.

(3) As a micro-barograph using a single, temperature-compensated capsule carrying the contact gauge surface, in combination with an auto-controlled feeler gauge surface caused to approach the contact gauge surface at intervals, the position of the feeler surface when vibratory contact takes place being recorded in any suitable known manner by apparatus under the control of the device employed to perform the gauging operation and giving an indication of the barometric pressure in terms of the movements of the capsule.

(4) As a recording extensometer for small test pieces or samples, brackets being clamped at the two ends of the test piece under observation, one carrying the contact gauge surface, the other the feeler gauge surface, and arranging the apparatus to give, as in (3) above, a record of the change of length of the test piece or sample under test.

In every case, the invention is only concerned with the means for ascertaining the position or a change in the position of a body carrying what has been throughout referred to as a "contact gauge surface". As the exact nature of the body is immaterial, whether it be the expansion element of a thermostat, the capsule of a micro-barograph, or the pointer of a measuring instrument, these have not been shown in the figures described hereafter, but only represented by the portion carrying the contact surface.

*Pointer instruments.*—When it is adapted to determine the position of a pointer on a scale, however, the gauge makes possible a number of special developments:

(5) The position of the pointer of an electrically controlled pointer instrument can be determined with an error of about $10^{-4}$ ins.;

(6) As a development from (5), the movement of the pointer of a primary instrument may be duplicated and magnified by a secondary instrument, so that a robust, quick-acting, insensitive measuring instrument can be used (as the secondary instrument) to measure with accuracy quantities, e. g. currents, which cause a deflection of a few thousandths of an inch of the pointer of the primary instrument. For instance, a quick-acting, sensitive, thermo-electric pyrometer can be designed on these lines;

(7) Any physical quantity which can be measured electrically using a "bridge" method can be kept under control by providing the current measuring instrument which indicates the "balance" with a gauge device as described above; for instance illumination, resistance, inductance, velocity, may be measured in this manner;

(8) Any pointer instruments, whether electrical or not, can be provided by its means with maximum or minimum deflection indicators;

(9) Particularly designed electrical pointer instruments can be developed which avoid the complication of pivots and coiled springs and have only minute deflections. These deflections are, however, magnified and if necessary recorded on the lines of (7) and (8) above.

The setting-in of the particularly distinctive mode of vigorous vibration may be observed either by ear, directly or by means of a microphone, or by eye, for example by the flicker of the pointer of a current meter, as already mentioned or by the change of the shape of the oscillation envelope, as viewed by means of an oscilloscope, a method which will be described hereafter.

It will be understood that I do not claim as my invention the numerous manners of observing the setting-in of the instability phenomenon. These methods of observations are well known and belong to usual laboratory technique.

*Examples of apparatus.*—A few apparatus, selected among the most important of the applications of which the invention is capable, will be now described as examples which are by no means limitative in any respect.

Referring to the drawings left herewith, which illustrate, for the sake of illustration only, apparatus embodying the present invention:—

Fig. 1 represents diagrammatically a vibrator for a simple form of gauge suitable for an apparatus according to the invention;

Figs. 2, 3a, 3b, 4a, 4b, 4c, 4d, 5 and 6, are diagrams of electric circuits used in connection with the gauge shown in Fig. 1;

Figs. 7, 8a, and 8b represent diagrammatically constructional parts of apparatus embodying the invention;

Fig. 9 is a diagram of an electric circuit illustrating an application of the invention for ascertaining with extreme accuracy the position of a pointer on a scale.

Fig. 10 represents diagrammatically a pointer instrument.

In the form of vibrator shown in Fig. 1, the vibrator element 4 is mounted on a support 5 and a base 7, and is maintained in oscillation by an alternating current in the winding g of an electromagnetic system 3; it carries the feeler gauge member 1, and also a mass 2 adjustable in magnitude and in position. A jar-sensitive or "chatter" electrical contact is shown at 6—6"—6', mounted on the vibrator. The mass 2 is so chosen that one of the natural periods of vibration of the vibrating system 1—2—4—6—6' is near to the fundamental frequency of the forces developed on the vibrator 4 by the system 3, or to one of the overtones of this frequency. When so adjusted, as it has been explained above, the vibration of the vibrator element becomes unstable and changes its mode of vibration as soon as the gauge surface on the member 1 touches with a certain minimum force a gauge surface 1' on a solid body, for example on the body the displacement of which is to be detected, observed, indicated, measured, recorded or utilized. (This minimum force becomes smaller as the frequency of the driving forces approaches more closely the frequency to which the vibrator is adjusted to resonate.) The "chatter" contact consists of a small, light, spring carrying a mass at the free end which it holds against a contact 6" carried by the vibrator 4, suitable arrangements being made to carry an electric current to and from the contact surfaces. This arrangement can be adjusted in such a way that it is unaffected by the steady vibratory motion of the vibrator 4, but it momentarily breaks the contact between the mass 6 and the contact 6" when the mode of vibration of the vibrator 4 is changed owing to "vibratory contact" of the feeler gauge surface of the member 1 with the contact gauge surface on the object gauged. The gauge surface 1' is shown mounted on a member s which may be the expansion element of a thermostat regulator, or a barometric capsule, or a part of an object tested on an extensiometer, or part of the end of the pointer of a measuring instrument or of a maximum (or minimum) indicator.

This jar-sensitive or "chatter" contact 6 is preferably mounted in the manner shown in the figure, that is, so that the rebound of the feeler gauge surface 1 from the object gauged tends to withdraw the vibrator 4 away from the mass, which is delayed by its inertia.

The jar-sensitive or "chatter" contact is necessary only when the gauge is to be used in conjunction with certain types of subsidiary controlling apparatus; for the more simple applications of the gauge it is sufficient to provide other means of observing the jarring of the vibrator: for example, a microphone "button" p may be fixed to the vibrator, preferably near to or at the support 5.

By reversing the feeler gauge member and suitably choosing the material and the dimensions of the members 1, 4, 5 and 7, it is possible to arrange that changes in the mean temperature of the parts of the gauge have no effect upon the distance between the feeler gauge surface of the member 1 and the base 7.

In Fig. 2, a circuit is shown which provides for the energization of a relay 8 by the momentary opening of the jar-sensitive or "chatter" contact 6" ("break" control). The relay is operated by means of a source of current such as the battery 11 or the single-wave rectifier 13 (it is however preferable not to employ alternating current if very rapid response of the relay is desired). A resistance 10 is provided to limit the intensity of the current when the jar-sensitive or "chatter" contact 6" is closed. A choke coil 9 may be put in the circuit; it is of assistance in two ways: when a rectifier 13 is used it helps to maintain the alternating potential difference across the rectifier when the jar-sensitive or "chatter" contact 6" is closed, and thus reduces the delay in the operation of the relay when this contact opens. Again, when either supply arrangement is used, the electrical inertia of the choke coil 9 assists the operation of the relay 8, since it tends to force the current flowing through the jar-sensitive or "chatter" contact 6" to flow through the relay 8 without any alteration in its magnitude; this assists the quickness of response of the relay. A spark-quenching circuit 12 assists the operation of the circuit and tends to protect the contacting surfaces of the jar-sensitive contact 6" from becoming damaged by pitting.

A modification of this circuit is shown in Fig. 3a, which illustrates a method for the de-energization of the relay 8 by the intermittent closing of the circuit at the pair of gauging surfaces, which are represented on the figure by 1 and 1' ("make" control). The relay is operated by power sources 11 or 13 as in Fig. 2, but a non-inductive resistance 16 is substituted for the choke coil 9, and a large condenser 15 is substituted for the spark-quenching circuit, this condenser being discharged when the circuit is closed at contacts 1 and 1'. The degree of discharge depends upon the duration of the contact and the resistance of the discharge circuit. It is found that, with condensers of 2000 micro-farads charged to 4–6 volts, a safety resistance of 50 ohms or more can be inserted at r without seriously interfering with the operation of the circuit. Such a resistance reduces the risk of the contacts at 1 and 1' becoming welded together. By suitably selecting the value of the resistance 16, the relay 8 can be made to remain with its contacts "open" for a considerable period of time, say up to 1 second, if in this interval of time no new closing of the circuit has occurred at 1—1'. In this way, an intermittent contact at 1—1' results in the continued partial de-energization of the relay 8 and, consequently, in the contacts of this relay being maintained in the same position. The cessation of the contacts at 1—1' results, after a delay, in the contacts of the relay moving back into their alternative position.

This delay is a disadvantage in certain cases, and it may be avoided by using a circuit which combines the arrangements of the circuit shown in Fig. 2 and of another circuit, as shown in Fig. 3b, in which the pair of contacts 1—1' make intermittent contact when the circuit is completed through the feeler gauge surface of the member 1 of Fig. 1 and the contact gauge surface 1' of the body under observation. These contacts 1 and 1' may be used as shown in Fig. 3b to operate a quick acting relay 18 by means of a battery circuit 17; this relay has contacts 19 which take the place of the jar-sensitive or "chatter" contact 6'' of Fig. 2.

Fig. 4a shows the simplest method of controlling the movement of the vibrator of a gauge of the type shown in Fig. 1. In this figure, the winding g is the winding of the electromagnetic driving system 3 of Fig. 1.

In this arrangement, a resistance a, and a current-measuring instrument $m_a$ are connected in series with the winding g. The former is preferably invariable in order that the behaviour of the gauge may remain uniform when the vigorous vibration has set in; the adjustment of the alternating current is made by means of the potentiometer resistance b. The current-measuring instrument $m_a$ should be quick acting, for example, of the rectifier-fed type. The resistance b is adjusted by hand until the amplitude of vibration of the gauge is sufficient to cause contact between the feeler gauge surface of the member 1 (Fig. 1) and the contact gauge surface of the object gauged. The sudden appearance of the vigorous vibration indicates that vibratory contact has been established. The reading of the current-measuring instrument $m_a$ corresponding to the appearance of the vigorous vibration is noted. Any relative displacement between the feeler gauge surface and the contact gauge surface on the gauged object can then be measured by repeating this process and noting the new reading of the current-measuring instrument $m_a$. The difference in the readings is a measure of the displacement.

The three main drawbacks of this arrangement are:

(1) The changes in current must be made very gently so that the vibrator is not noticeably jarred;

(2) The accuracy of measurement varies from point to point on the scale of measurement, for when the current is large the gauge is most sensitive and reciprocally;

(3) As the accuracy attainable is not much better than 1%, (owing to (1), above) the smallest distance measureable is comparable with the amplitude of vibration (which may be $600 \times 10^{-6}$ ins.).

Practically all these deficiencies can be made good by using the circuit shown in Fig. 4b. It will be noted that, in this circuit, the winding of the electromagnetic driving system now carries direct as well as alternating current, the intensity of the latter being constant while measurement is in progress. A "blocking" condenser e prevents leakage of D. C. through the alternating current-measuring instrument $m_a$. The D. C. is used to make the measuring operation by shifting the mean position of the vibrator towards the contact gauge surface of the body under observation. This D. C. is read on the current-measuring instrument $m_d$. In practice if this current-measuring instrument $m_d$ has a uniform scale and the gauge windings are polarized, its readings are very closely proportional to the displacement of the mean position of the vibrator 4 (Fig. 1). The resistance c is used to control the current in the current-measuring instrument $m_d$. By using a very large condenser at d, sudden jars are not transmitted to the vibrator element of the gauge; moreover, as the condenser and resistance network can be made to have a very large time-constant the movement of the needle of the current-measuring instrument $m_d$ is very slow and its position can be judged very closely by eye when the vigorous mode of vibration makes its appearance. Since the amplitude of vibration is practically unaltered by the superposition of the D. C. on the A. C., the precision of operation of the gauge is practically independent of the reading of the current-measuring instrument $m_d$. Again, very small displacements can be measured with this arrangement (e. g. a displacement of $10^{-6}$ ins. can be measured with an accuracy of about 5 to 10% when the amplitude of vibration of the feeler gauge surface is from 200 to $300 \times 10^{-6}$ ins.). By using a vibrator element of greater stiffness, measurements of still smaller displacements can be made.

It is found that the presence of the alternating flux due to the A. C. reduces the hysteresis effects naturally associated with the unidirectional, but variable, flux produced by the changes of D. C. during the gauging operation. The maximum value assumed by the D. C. may equal the maximum value of the A. C. without the hysteresis becoming sufficiently large to affect the calibration of the gauge. A choke coil 9' may be inserted in the D. C. circuit to reduce the intensity of the A. C. passing through the current-measuring instrument $m_d$.

Owing to the extreme slowness with which the D. C. can be altered this arrangement can be made to give very high accuracy.

In order to obtain results more quickly, but with slightly less accuracy, the arrangement of Fig. 4c can be used. In this the gauging operation is entirely automatic and cyclic.

A suitable amplitude of vibration is obtained by setting the A. C. at a fixed value. The gauging operation is carried out by D. C. on the same principles as with the arrangement of circuits shown in Fig. 4b. The D. C. is controlled by the operation of a relay such as 8 in Figs. 2 or 3a, which is itself under the control of the gauge contacts. Thus the relay may be connected so that the contact 16 of this relay 8 is opened at the moment vigorous vibration sets in.

If, now the connections are such that the current from the battery 11 causes the contact and feeler gauge surfaces to approach each other, the opening of the contact 16 results in the condenser 19 slowly discharging and in the contact and feeler gauge surfaces separating. The separation will continue so long as the vigorous vibration persists, but, as soon as the withdrawal is sufficient, the vigorous vibration vanishes, the relay contact closes again and the gauge surfaces again approach each other. Thus a cyclic operation is carried out; the maximum indication of the current-measuring instrument $m_d$ is a measure of the distance through which the feeler gauge surface has been displaced by the D. C. An alternative circuit is possible in which the relay 8 short-circuits the condenser 19 at the moment that vigorous vibration is initiated. This restores the current-measuring instrument and the vibrator to their undeflected positions and the cycle of operations proceeds as above. Here also a choking coil 9 may be inserted in the D. C. circuit.

In Fig. 4d, instead of operating a relay, the jar-sensitive contact 6" is arranged to cause the large condenser 19 to charge up as soon as the contact 6" begins to chatter. In the figure, the source of potential difference by which the condenser 19 is charged is shown as a single wave rectifier 13. The appearance of a potential difference at the terminals of the condenser 19 causes a unidirectional current to flow through the D. C. measuring instrument $m_d$ and the driving winding $g$ of the gauge, and this causes the arrangement to function in a manner similar to that of the circuit shown in Fig. 4c. The object of this modified arrangement is to obtain a quicker response of the controlling current to the chattering of the contact 6".

Fig. 5 represents a circuit which is adapted to be inserted between the driving winding $g$ of the gauge and the source of A. C., in order to make the scale of measurement, which is based on the reading of the D. C. measuring instruments of Figs. 4b, 4c and 4d, independent of small chance variations in the alternating current supplying the driving system of the vibrator. The function of this circuit is to provide a biassing unidirectional current as closely as possible proportional to the alternating current which passes through the circuit. For many purposes the circuit of Fig. 5 does this with sufficient accuracy, but, when greater accuracy is essential more complex circuits can be easily devised on the same principles. It will be seen that the rectifier 24 with resistance 21 and condenser 20 are connected in parallel with the source of A. C. The potential difference across the rectifier 24 will therefore vary in conformity with any change in the potential difference supplying the driving winding $g$ of the gauge. The rectified current produced by 24 passes to the winding $g$ through a choke coil 28. The A. C. measuring instrument $m_a$ is isolated from the D. C. circuit by the condenser 22. Adjusting resistances 21, 23 and 27 make it possible to adjust the relative proportions of A. C. and D. C. supplied to $g$. The direction of the D. C. is arranged so that it withdraws the mean position of the vibrator away from the contact gauge surface on the body under observation. In a gauge employing this circuit it was found that ±25% variation in the value of the alternating potential at the terminals of the apparatus resulted in an error of $5 \times 10^{-7}$ ins. in the measurement scale. The amplitude of vibration of the feeler gauge surface was 200 to $300 \times 10^{-6}$ ins.

As mentioned earlier the same effect can be obtained by employing a non-polarized winding at $g$, without the biassing circuit. Then if the gauge has the form shown in Fig. 1, the position in space of the upper edge of the envelope of the vibration of the contact gauge surface of the member 1 can be made practically independent of the value of the A. C. flowing in the windings 3. If there is a slight fall of the envelope edge when the A. C. is increased, the mass 2 (Fig. 1) is readjusted to bring the vibrator more closely into resonance with the driving current, and reciprocally.

When the gauge is employed for other than pure distance-measurement various subsidiary circuits are useful. For example, if the circuit of Fig. 4c is modified by the omission of the resistance $r$ and of the contact 17 it may be used to convert the gauge into a device which gives an indication or sets in action subsidiary apparatus (by the operation of a relay, for example), when the body gauged reaches a certain position relatively to the gauge itself, that is, to convert the gauge into a maximum or minimum indicator or controller, the current from the source 18 of D. C. being adjusted so that the closure of the contact 16 does not completely extinguish the vigorous vibration, the extinction being completed by the withdrawal of the contact gauge surface of the body gauged.

If it is found desirable to control the circuit of Fig. 4a by automatic means, it becomes necessary to alter the alternating current in a gradual manner. This can be done by the artifice illustrated in Fig. 6. A "bridge" rectifier is inserted in one of the A. C. leads, having a large condenser 30, shunted by a resistance 29 in series with a contact 28 which, for example, may be one of the contacts controlled by the relay 8. This contact is normally closed so that the bridge denser 30 charges up slowly and opposes the A. C. If the contact 28 is opened, however, (as a result, for instance of the setting-in of the vigorous vibration and the operation of a relay) the condenser 30 charges up slowly and opposes the A. C. This has the effect of reducing the A. C. fed to the vibrator and therefore causes the extinction of the vigorous vibration.

On the closing of the contact 28 the condenser discharges slowly through the resistance 29 and the cycle repeats itself. A condenser of 2000–4000 microfarads is suitable with a bridge having an effective resistance of about 1000 ohms.

The two methods of extinguishing the vigorous vibration, namely, the shifting of the main position of the vibrator by a D. C. and the reduction of the amplitude of vibration by the method just described may be combined with advantage in those cases in which the amplitude of the vigorous vibration is excessive.

In some cases it is not convenient to suppress the vigorous vibration by a movement of the mean position of the vibrator or by the method referred to above. Fig. 7 illustrates a method of reducing the amplitude of vibration and extinguishing the vigorous vibration by induced eddy currents.

A suitable shaped electromagnet 31 is arranged to produce eddies in a conducting metal strip 32 passing between its poles. The current energizing the magnet may be auto- or hand-controlled.

Fig. 8a represents an arrangement by means of which a gauge may be built which can be used to measure with accuracy distances which are greater than the amplitude of vibration of the vibrator. The feeler gauge surface (for example) is mounted on a frame which can be deflected (preferably so that the gauge surface 1 is moved in its plane of vibration), for example, by a mass 33 sliding on a bar 34. The deflections of the feeler gauge surface 1 due to a given displacement of the mass 33 can be measured by the gauge shown at 4, 5, which operates in any one of the manners described above. In the figure the mounting of the gauge bracket ensures that it bends about the point 0, vertically below the gauge surface 1.

Fig. 8b represents another arrangement by means of which a gauge system 4—5—7—35 may be used to measure the distance between two surfaces. The gauge carries a double-faced gauge piece 35. This can be brought near to the surface of either of the test surfaces 37 by a device similar to that shown in Fig. 8a. It is clear that, knowing the length of the gauge piece 35 and the calibration of the gauge the distance between the pieces 37 can be found and changes in the length of the object 36 can be measured.

*Application to pointer instruments.*—Any of the previous arrangements of the gauge may be adapted, if desired, to the measurement of the displacement of pointers of pointer-instruments. In this way the arrival of the pointer at any chosen point on the scale of the instrument can be registered with great precision (to $10^{-4}$ or $10^{-5}$ ins.), by providing the pointer with a contact gauge surface and placing a vibrating feeler gauge surface at the chosen point of the scale, the arrival of the pointer at this point being indicated with extreme accuracy by the setting-in of vigorous vibration. This makes possible the "magnification" arrangement shown in Fig. 9. In this arrangement, the pointer of the current-measuring instrument $m_d$ is provided with a contact gauge surface 1' which, at the zero position of the pointer, is in vibratory contact with a feeler gauge surface 1. The current-measuring instrument $m_d$ is deflected by the current the value of which is required, it is also deflected, but in the opposite direction by a very small fraction of an opposing current read on another current-measuring instrument $m_d'$, which current is derived from a large condenser 38 charged by a battery 11. When these two currents, passing in opposite directions through the current-measuring instrument $m_d$ are exactly equal, the current-measuring instrument $m_d$ indicates zero, the pointer reaches the position in which the vibratory contact becomes operative, and this may be made to cause a relay 8 to function. This relay opens the contact at $f$ (or closes a contact at $h$) and so causes the current in the current-measuring instrument $m_d'$ to fall (or become nil) thus removing the pointer of the current-measuring instrument $m_d$ away from the gauge and so initiating the cycle of operations. The maximum indication of the current-measuring instrument $m_d'$ is a measure of the current deflecting the current-measuring instrument $m_d$ and the indication of the instrument $m_d'$ is a measure, on a large scale, of the small current flowing through the instrument $m_d$. If, in such an arrangement, the vibrator is so placed that vibratory contact occurs between the pointer of the instrument $m_d$ and the feeler gauge surface, when the current through $m_d$ has a certain value other than zero, a movement of the pointer of the instrument $m_d'$ then serves to indicate the moment at which the vigorous vibration sets in, and its deflection from zero becomes a measure of the excess of the current in $m_d$ over the certain value chosen. Alternatively, the condenser 38 may be charged or discharged directly by way of the gauging surface carried by the pointer of the current-measuring instrument $m_d$.

By this means one micro ampere at $m_d$ can be made to appear as a deflection of one milliampere at $m_d'$.

It is preferable that the current-measuring instruments $m_d$ and $m_d'$ should have a similar response to transient forces. Alternatively if $m_d'$ is the more swiftly acting instrument it may be made sluggish by connecting condensers in parallel or other known means.

The fact that the pointer of the current-measuring instrument $m_d$ is not required to deflect more than a small fraction of an inch (or a fraction of a degree) permits the use of pointers without pivots and without coiled springs, for example, of pointers the stem of which is flexible and rigidly fixed at one end, the other end being deflected by a force which is a known function of the quantity to be measured. This would simplify the construction of such instruments to a degree hitherto impossible. Such an instrument is illustrated diagrammatically in Fig. 10.

The above devices provide methods and apparatus for micro-measurements hitherto unequalled for their accuracy and simplicity of technique. It will be understood that variations in details may be made to the apparatus described and to the electric circuits required for their operation, as well as applications of the methods and apparatus herein described to purposes not referred to, without departing from the spirit of the invention, as set forth in the statement of claims.

In Fig. 10, 40 is a flexible resilient member constituting the pointer of a measuring instrument adapted for the measurement of any quantity whatsoever the magnitude of which is capable of being indicated by the position of a pointer on a graduated scale. In the instrument shown diagrammatically in the figure, there is no scale and the flexible resilient member is clamped to the fixed frame of the instrument at 41, and it is acted upon by a force F, which bears a definite relationship to the quantity to be measured, so that the magnitude of the quantity to be measured can be derived easily and accurately from the magnitude of the force F, this latter magnitude being ascertained by the deflection or bending of the member 40 from the position it occupies when the force F=zero. 42 is a contact gauge surface on the said member 40, and 4 is a vibrator, with a feeler gauge surface 1 and driving means $g$.

The most minute deflection of the member 40 is measured by means of the feeler gauge member 4 in combination with any suitable arrangement among those described above and shown diagrammatically in the drawings.

When describing the application of the vibrator to pointer instruments, it has been shown (paragraph 8) that any pointer instrument can be provided by its means with maximum or minimum deflection indicators. In this particular case, this is carried out by setting the vibrator 4 away from the position occupied by 42 when the force F is zero; the same arrangement then serves to give an indication of the moment at which the force F reaches any desired relatively large (maximum) value, and to measure, if necessary, the excess of the force over this value.

As a particular example in the case of a microbarometer, the member 40 may be of the nature of a Bourdon gauge element.

The operation of any apparatus provided with a device according to the invention may be made self recording, for example in a manner already described. The apparatus is connected as shown in Fig. 5, with a controlling circuit such as shown in Fig. 4c. The recording is effected by the instrument m in Fig. 4c. The recorder itself may be either a spark or a pen recorder of any known type.

What I claim is:

1. A contact indicating device for a linear dimension gauge comprising: a supporting base; a vibrator, the natural frequency of vibration of which, is adjustable; means for maintaining the said vibrator in a state of vibration the amplitude of which normally is controlled; a feeler gauge surface, the position of which, relative to the said supporting base, is capable of fine adjustment, mounted on the said vibrator; means for performing and controlling a gauging operation; means for producing, for controlling and for measuring very minute displacements of the said feeler gauge surface, for the purpose of fine adjustment; a contact gauge surface adapted to make contact with the feeler gauge surface when the said contact gauge surface is in a definite position, one of the two said gauge surfaces being carried by a solid body the displacement of which is the object of the gauging operation, the vibrator being so adjusted and mounted upon the said support that the frequency of one of its modes of natural vibration is near to the frequency of the driving forces of the vibrating system, the difference between these two frequencies having such a value that when the contact gauge surface comes in close proximity to the feeler gauge surface, so that it is touched by the latter with a certain very small force of impact, there is set up a particularly distinctive mode of intermittent contact between the two gauge surfaces which causes the said vibrator to break into a new vigorous mode of vibration characterized in that this vigorous vibration persists when the contact gauge surface is brought back into the position it occupied when the initial impact occurred, and even when it is withdrawn slightly further away and means for ascertaining substantially the instant when the vigorous vibration sets in.

2. A contact indicating device for a linear dimension gauge as claimed in claim 1, characterized in that the means for maintaining the vibrator in a state of vibration the amplitude of which normally is controlled comprises an electromagnetic drive.

3. A contact indicating device for a linear dimension gauge as claimed in claim 1, characterized by electromagnetic means for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current.

4. A contact indicating device for a linear dimension gauge as claimed in claim 1 characterized by electromagnetic means for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, and in which the means for ascertaining substantially the instant when the vigorous vibration sets in comprise an instrument for performing at that instant, a subsidiary operation.

5. A contact indicating device for a linear dimension gauge as claimed in claim 1, in which the vibration of the vibrator is maintained by an electromagnetic drive, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, the means for ascertaining substantially the instant when the vigorous vibration sets in comprising an instrument for performing a subsidiary operation, said subsidiary operation consisting in moving the object carrying the contact gauge surface.

6. A contact indicating device for a linear dimension gauge as claimed in claim 1, in which the vibration of the vibrator is maintained by an electromagnetic drive, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, the means for ascertaining substantially the instant when the vigorous vibration sets in comprising an instrument for performing a subsidiary operation, said subsidiary operation consisting in moving the object carrying the contact gauge surface, in combination with any instrument possessing a member carrying the contact gauge surface and capable of altering its position, which position can be very accurately ascertained by the setting in of the vigorous vibration.

7. A contact indicating device for a linear dimension gauge as claimed in claim 1, in which the vibration of the vibrator is maintained by an electromagnetic drive, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, the means for ascertaining substantially the instant when the vigorous vibration sets in comprising an instrument for performing a subsidiary operation, said subsidiary operation consisting in moving the object carrying the contact gauge surface, in combination with a pointer instrument the pointer of which carries the contact gauge surface and the position of which can be very accurately ascertained by the setting in of the vigorous vibration.

8. A contact indicating device for a linear dimension gauge as claimed in claim 1, in which the vibration of the vibrator is maintained by an electromagnetic drive, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, the means for ascertaining substantially the instant when the vigorous vibration sets in comprising an instrument for performing a subsidiary operation, said subsidiary operation consisting in moving the object carrying the contact gauge surface, in combination with a pointer instrument the pointer of which is a flexible resilient member clamped at one end to the fixed frame of the instrument and carries at its free end the contact gauge surface, the position of the free end of which pointer can be very accurately ascertained by the setting in of the vigorous vibration.

9. A contact indicating device for a linear dimension gauge as claimed in claim 1, characterized by electromagnetic means for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, and in which the means for ascertaining substantially the instant when the vigorous vibration sets in comprise an instrument for performing a subsidiary operation, said subsidiary operation consisting in altering the amplitude of the vibration of the vibrator, and means for indicating the said change of amplitude.

10. A contact indicating device for a linear dimension gauge as claimed in claim 1, characterized by an electromagnetic drive for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, in which the means for ascertaining substantially the instant when the vigorous vibration sets in, comprise an instrument for performing a subsidiary operation, said subsidiary operation consisting in altering the amplitude of vibration of the vibrator and means for indicating the said change of amplitude, the circuit comprising a source of alternating current in the electric circuit of the said drive, a "bridge" rectifier assembly connected with one of its diagonals in series with the said source, a relay, a resistance in series with one of the pairs of contacts of the said relay, and a large electric condenser connected in the other diagonal of the bridge, said resistance and relay contacts in series being connected as a shunt to the terminals of the said condenser, so that when the contacts open owing to the relay being energized by the setting-in of the vigorous vibration, the condenser charges up slowly and reduces the alternating current supplied to the gauge winding, the said condenser discharging slowly when the contacts close.

11. A contact indicating device for a linear dimension gauge as claimed in claim 1, characterized by an electromagnetic drive for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, in which the means for ascertaining substantially the instant when the vigorous vibration sets in, comprise an instrument for performing a subsidiary operation, said subsidiary operation consisting in altering the amplitude of vibration of the vibrator and means for indicating the said change of amplitude, the circuit comprising a source of alternating current in the electric circuit of the said drive, a "bridge" rectifier assembly connected with one of its diagonals in series with the said source, a relay, a resistance in series with one of the pairs of contacts of the said relay, and a large electric condenser connected in the other diagonal of the bridge, said resistance and relay contacts in series being connected as a shunt to the terminals of the said condenser, so that when the contacts open owing to the relay being energized by the setting-in of the vigorous vibration, the condenser charges up slowly and reduces the alternating current supplied to the gauge winding, the said condenser discharging slowly when the contacts close, the whole arrangement being in combination with any instrument possessing a member carrying the contact gauge surface and capable of altering its position, which position can be very accurately ascertained by the setting in of the vigorous vibration.

12. A contact indicating device for a linear dimension gauge as claimed in claim 1, characterized by an electromagnetic drive for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, in which the means for ascertaining substantially the instant when the vigorous vibration sets in, comprise an instrument for performing a subsidiary operation, said subsidiary operation consisting in altering the amplitude of vibration of the vibrator and means for indicating the said change of amplitude, the circuit comprising a source of alternating current in the electric circuit of the said drive, a "bridge" rectifier assembly connected with one of its diagonals in series with the said source, a relay, a resistance in series with one of the pairs of contacts of the said relay, and a large electric condenser connected in the other diagonal of the bridge, said resistance and relay contacts in series being connected as a shunt to the terminals of the said condenser, so that when the contacts open owing to the relay being energized by the setting-in of the vigorous vibration, the condenser charges up slowly and reduces the alternating current supplied to the gauge winding, the said condenser discharging slowly when the contacts close, the whole arrangement being in combination with a pointer instrument the pointer of which carries the contact gauge surface and the position of which can be very accurately ascertained by the setting in of the vigorous vibration.

13. A contact indicating device for a linear dimension gauge as claimed in claim 1, characterized by an electromagnetic drive for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, in which the means for ascertaining substantially the instant when the vigorous vibration sets in, comprise an instrument for performing a subsidiary operation, said subsidiary operation consisting in altering the amplitude of vibration of the vibrator and means for indicating the said change of amplitude, the circuit comprising a source of alternating current in the electric circuit of the said drive, a "bridge" rectifier assembly connected with one of its diagonals in series with the said source, a relay, a resistance in series with one of the pairs of contacts of the said relay, and a large electric condenser connected in the other diagonal of the bridge, said resistance and relay contacts in series being connected as a shunt to the terminals of the said condenser, so that when the contacts open owing to the relay being energized by the setting-in of the vigorous vibration, the condenser charges up slowly and reduces the alternating current supplied to the gauge winding, the said condenser discharging slowly when the contacts close, the whole arrangement being in combination with a pointer instrument the pointer of which is a flexible resilient member clamped at one end to the fixed frame of the instrument and carries at the free end the contact gauge surface, the position of the free end of which pointer can be very accurately ascertained by the setting-in of the vigorous vibration.

14. A contact indicating device for a linear dimension gauge as claimed in claim 1, characterized by electromagnetic means for maintaining the vibration of the vibrator, comprising a compensating arrangement for shifting the mean position of the vibrator away from the contact gauge surface on the object being gauged when the alternating driving forces increase, so that the position in space of the feeler gauge surface at its extreme excursion towards the contact gauge surface is independent of small changes in the alternating driving current, and in which the means for ascertaining substantially the instant when the vigorous vibration sets in comprise an instrument for performing a subsidiary operation, said subsidiary operation including the production of a unidirectional force (besides that due to the compensating arrangement) resulting in an additional displacement of the mean position of the vibrator relatively to its support and means for indicating the said additional displacement of the mean position of the vibrator.

15. A contact indicating device for a linear dimension gauge as claimed in claim 1, characterized by electromagnetic driving means for maintaining the vibration of the vibrator, said means comprising a compensating arrangement for shifting the mean position of the vibrator away from the contact gauge surface on the object being gauged when the alternating driving forces increase, so that the position in space of the feeler gauge surface is independent of small changes in the alternating driving current, and a source of alternating current, a polarized driving system, a rectifier in the alternating current circuit feeding the said driving system so connected as to provide a rectified biassing current substantially proportional to the driving current and means for also feeding the rectified current from the said rectifier into the said driving system, in such a direction as to shift the mean position of the vibrator away from the contact gauge surface when the alternating driving current increases, the means for ascertaining substantially the instant when the vigorous vibration sets in comprising an instrument for performing a subsidiary operation, said subsidiary operation including the production of a unidirectional force (besides that due to the compensating arrangement) resulting in an additional displacement of the mean position of the vibrator relatively to its support and means for indicating the said additional displacement of the mean position of the vibrator.

16. A contact indicating device for a linear dimension gauge as claimed in claim 1, characterized by electromagnetic driving means for maintaining the vibration of the vibrator, said means comprising a compensating arrangement for shifting the mean position of the vibrator away from the contact gauge surface on the object being gauged when the alternating driving forces increase, so that the position in space of the feeler gauge surface is independent of small changes in the alternating driving current, and a source of alternating current, a polarized driving system, a rectifier in the alternating current circuit feeding the said driving system so connected as to provide a rectified biassing current substantially proportional to the driving current and means for also feeding the rectified current from the said rectifier into the said driving system, in such a direction as to shift the mean position of the vibrator away from the contact gauge surface when the alternating driving current increases, the means for ascertaining substantially the instant when the vigorous vibration sets in comprising an instrument for performing a subsidiary operation, said subsidiary operation including the production of a unidirectional force (besides that due to the compensating arrangement) resulting in an additional displacement of the mean position of the vibrator relatively to its support and means for indicating the said additional displacement of the mean position of the vibrator, the subsidiary apparatus controlling the mean position of the vibrator being itself controlled by a relay brought into operation by the setting in of the vigorous vibration.

17. A contact indicating device for a linear dimension gauge as claimed in claim 1, characterized by electromagnetic driving means for maintaining the vibration of the vibrator, said means comprising a compensating arrangement for shifting the mean position of the vibrator away from the contact gauge surface on the object being gauged when the alternating driving forces increase, so that the position in space of the feeler gauge surface is independent of small changes in the alternating driving current, and a source of alternating current, a polarized driving system, a rectifier in the alternating current circuit feeding the said driving system so connected as to provide a rectified biassing current substantially proportional to the driving current and means for also feeding the rectified current from the said rectifier into the said driving system, in such a direction as to shift the mean position of the vibrator away from the contact gauge surface when the alternating driving current increases, the means for ascertaining substantially the instant when the vigorous vibration sets in comprising an instrument for performing a subsidiary operation, said subsidiary operation including the production of a unidirectional force (besides that due to the compensating arrangement) resulting in an additional displacement of the mean position of the vibrator relatively to its support and means for indicating the said additional displacement of the mean position of the vibrator, the subsidiary apparatus controlling the mean position of the vibrator being itself controlled by a relay brought into operation by the setting in of the vigorous vibration, the whole arrangement being in combination with any instrument possessing a member carrying the contact gauge surface and capable of altering its position, which position can be very accurately ascertained by the setting-in of the vigorous vibration.

18. A contact indicating device for a linear dimension gauge as claimed in claim 1, characterized by electromagnetic driving means for maintaining the vibration of the vibrator, said means comprising a compensating arrangement for shifting the mean position of the vibrator away from the contact gauge surface on the object being gauged when the alternating driving forces increase, so that the position in space of the feeler gauge surface is independent of small changes in the alternating driving current, and a source of alternating current, a polarized driving system, a rectifier in the alternating current circuit feeding the said driving system so connected as to provide a rectified biassing current substantially proportional to the driving current and means for also feeding the rectified current from the said rectifier into the said driving system, in such a direction as to shift the mean position of the vibrator away from the contact gauge surface when the alternating driving current increases, the means for ascertaining substantially the instant when the vigorous vibration sets in comprising an instrument for performing a subsidiary operation, said subsidiary operation including the production of a unidirectional force (besides that due to the compensating arrangement) resulting in an additional displacement of the mean position of the vibrator relatively to its support and means for indicating the said additional displacement of the mean position of the vibrator, the subsidiary apparatus controlling the mean position of the vibrator being itself controlled by a relay brought into operation by the setting-in of the vigorous vibration, the whole arrangement being in combination with a pointer instrument the pointer of which carries the contact gauge surface and the position of which can be very accurately ascertained by the setting-in of the vigorous vibration.

19. A contact indicating device for a linear dimension gauge as claimed in claim 1, characterized by electromagnetic driving means for maintaining the vibration of the vibrator, said means comprising a compensating arrangement for shifting the mean position of the vibrator away from the contact gauge surface on the object being gauged when the alternating driving forces increase, so that the position in space of the feeler gauge surface is independent of small changes in the alternating driving current, and a source of alternating current, a polarized driving system, a rectifier in the alternating current circuit feeding the said driving system so connected as to provide a rectified biassing current substantially proportional to the driving current and means for also feeding the rectified current from the said rectifier into the said driving system, in such a direction as to shift the mean position of the vibrator away from the contact gauge surface when the alternating driving current increases, the means for ascertaining substantially the instant when the vigorous vibration sets in comprising an instrument for performing a subsidiary operation, said subsidiary operation including the production of a unidirectional force (besides that due to the compensating arrangement) resulting in an additional displacement of the mean position of the vibrator relatively to its support and means for indicating the said additional displacement of the mean position of the vibrator, the subsidiary apparatus controlling the mean position of the vibrator being itself controlled by a relay brought into operation by the setting-in of the vigorous vibration, the whole arrangement being in combination with a pointer instrument the pointer of which is a flexible resilient member clamped at one end to the fixed frame of the instrument and carrying at its free end the contact gauge surface, the position of the free end of which pointer can be very accurately ascertained by the setting-in of the vigorous vibration.

EDMUND RAMSAY WIGAN.